United States Patent
Zuniga (10) Patent No.: US 7,241,093 B2
(45) Date of Patent: Jul. 10, 2007

(54) CARGO SECURING DEVICE

(75) Inventor: Francisco Zuniga, 128 Preakness Ave., Wayne, NJ (US) 07470

(73) Assignee: Francisco Zuniga, New Britain, CT (US)

( * ) Notice: Subject to any disclaimer, the term of this patent is extended or adjusted under 35 U.S.C. 154(b) by 0 days.

(21) Appl. No.: 10/831,112

(22) Filed: Apr. 26, 2004

(65) Prior Publication Data

US 2005/0238454 A1     Oct. 27, 2005

(51) Int. Cl.
*B60P 7/08* (2006.01)
(52) U.S. Cl. .................... 410/97; 410/102; 410/106
(58) Field of Classification Search .............. 410/96, 410/97, 99, 102, 106, 110, 116; 224/403, 224/568; 248/499
See application file for complete search history.

(56) References Cited

U.S. PATENT DOCUMENTS

| | | | | |
|---|---|---|---|---|
| 2,000,306 | A | * | 5/1935 | Tobin .................... 410/10 |
| 2,827,958 | A | * | 3/1958 | Lee |
| 2,972,490 | A | * | 2/1961 | Styx ..................... 410/97 |
| 3,331,334 | A | * | 7/1967 | Broling .................. 410/102 |
| 3,426,996 | A | * | 2/1969 | Broling |
| 3,841,660 | A | | 10/1974 | Clark |
| 3,888,190 | A | * | 6/1975 | Bigge .................... 410/101 |
| 4,396,324 | A | | 8/1983 | Ellis |
| 4,487,537 | A | | 12/1984 | Morse |
| 4,650,383 | A | | 3/1987 | Hoff |
| 4,717,298 | A | | 1/1988 | Bott |
| 4,850,769 | A | | 7/1989 | Matthews |
| 4,900,204 | A | | 2/1990 | Summers |
| 4,936,724 | A | | 6/1990 | Dutton |
| 4,955,771 | A | | 9/1990 | Bott |
| 5,040,934 | A | | 8/1991 | Ross |
| 5,259,711 | A | | 11/1993 | Beck |
| 5,431,472 | A | | 7/1995 | Coffland |
| 5,533,848 | A | | 7/1996 | Davis |
| 5,538,376 | A | | 7/1996 | Borda |
| 5,599,055 | A | | 2/1997 | Brown |
| 5,716,176 | A | | 2/1998 | Anderson |
| 5,772,369 | A | | 6/1998 | Lerman et al. |
| 6,065,916 | A | | 5/2000 | Swensen |

(Continued)

FOREIGN PATENT DOCUMENTS

| | | |
|---|---|---|
| JP | 61-044040 | 3/1986 |
| JP | 61-160647 | 7/1986 |

*Primary Examiner*—Stephen Gordon
(74) *Attorney, Agent, or Firm*—Michaud-Duffy Group LLP (57) ABSTRACT

A cargo securing device for restraining cargo within a vehicle, including a chain assembly extended about the perimeter of a cargo area, and attached to spaced locations in the cargo area. Restrainers are attached at any point on the chain assembly and used to restrain cargo stored within the cargo area. Anchoring devices, such as brackets, are joined onto the chain assembly at various points, and then attached the cargo area sidewalls or cargo floor, securing the chain assembly to the surface. Additionally, the cargo securing device may include telescoping units attached to the chain assembly and secured to the sidewalls or floor. The telescoping units allow the chain assembly to be situated at different heights so that restrainers may strap about cargo at different heights.

7 Claims, 5 Drawing Sheets

U.S. PATENT DOCUMENTS

| | | |
|---|---|---|
| 6,077,007 A | 6/2000 | Porter et al. |
| 6,149,361 A | 11/2000 | Schrader |
| 6,250,860 B1 * | 6/2001 | Hornady ................ 410/47 |
| 6,290,440 B1 | 9/2001 | DiVaccaro |
| 6,315,346 B1 | 11/2001 | Martin |
| 6,328,511 B1 * | 12/2001 | Cardona ................ 410/12 |
| 6,439,815 B1 | 8/2002 | Liu |
| 6,626,620 B1 | 9/2003 | Veal |
| 6,626,623 B2 * | 9/2003 | DeLay ................ 410/116 |
| 6,629,807 B2 | 10/2003 | Bernardo |
| 6,644,901 B2 | 11/2003 | Breckel |
| 6,655,887 B2 | 12/2003 | McDonald |
| 6,783,311 B2 * | 8/2004 | Sauerwald ............... 410/97 |
| 2002/0048495 A1 | 4/2002 | Snyder et al. |
| 2002/0164225 A1 | 11/2002 | Anderson et al. |
| 2003/0095849 A1 | 5/2003 | Breckel |

* cited by examiner

CARGO SECURING DEVICE

BACKGROUND OF THE INVENTION

1. Field of the Invention

The present invention relates to a cargo securing device, and particularly to a cargo securing device allowing for multiple horizontal and vertical securing points.

2. Description of the Related Art

Individual movers, truck drivers and others frequently use cargo-fastening devices to stabilize the load so that assorted cargo may be safely hauled aboard various vehicles. The cargo often includes items that are of different sizes and heights. The items to be hauled, for example, may be simple crates or cumbersome and unwieldy furniture. It is necessary to confine the hauled items such that they do not slide about the vehicle or truck bed and thus become damaged. In order to secure the cargo, a variety of restraining devices are used, including ropes, elastic cords, wires, etc. The restraining devices are attached to truck bed walls or floors by anchors, hooks, and the like.

While effective to an extent, these restraining devices are limited to a certain number of anchoring points about the truck bed. The anchoring points are often restricted to four securing points, generally two in the front and two in the back. Some improvements provide an additional two anchoring points in the middle of the truck bed. However, six anchoring points may not be enough to effectively restrain certain types of cargo. In some instances, a greater number of securing points would be beneficial to the cargo hauler.

Additionally, a variety of securing mechanisms provide anchoring points along the same plane, such as along the truck bed or along a track attached about the sides of the truck bed. However, these mechanisms do not allow for multiple anchoring points along different planes, such that different types of hauled goods may be more easily accommodated.

Accordingly, there is a need for a simply constructed cargo securing mechanism that provides multiple fastening points. The greatest benefit to a cargo mover would be from a securing device that permits the securing of cargo at any point around the cargo area. Further, there is a need for a cargo securing mechanism that may be adjusted to varying heights to permit a greater range of anchoring points.

U.S. Pat. App. Pub. No. US 2002/0048495 A1, published Apr. 25, 2002 and invented by M. Anderson et al., describes a cargo bed tie-down system. Tie-down tracks are extended within the body of a truck and on the truck bed. The tracks do not extend beyond the adjoining truck body and are therefore more easily able to blend into the body of the truck.

U.S. Pat. No. 4,850,769, issued Jul. 25, 1989 to J. Matthews, describes a tie-down device for a pickup truck. The device has a movable car with a fastener that is slidably mounted on a track. The track is situated about the perimeter of the truck body and additional tracks may be situated on the truck bed. The car with the fastener attached may be moved along the track and used as an anchoring mechanism for any number of positions on the track.

U.S. Pat. No. 5,533,848, issued Jul. 9, 1996 to O. Davis, describes a payload tie-down system. The system consists of tracks placed about the perimeter of the truck body and along the truck bed. S-shaped hooks are attached to carriages that are slidable onto the tracks. The S-shaped hooks connect to ropes or other securing means to hold down cargo.

U.S. Pat. No. 4,396,324, issued Aug. 2, 1983 to R. Ellis describes a tie-down apparatus that is positioned along the side walls of a pick-up truck. Rails are extended between stake walls and engage holders positioned against the stake walls. The holders each have a coupling socket into which the rails are extended.

U.S. Pat. No. 4,936,724, issued Jun. 26, 1990 to V. Dutton describes a truck box top molding. Slotted rails are attached along the perimeter of the top of the truck box. The rails are fastened by screws extending within the truck box. The slots in the rails allow a rope, wire or the like to attach onto the truck box.

U.S. Pat. No. 5,040,934, issued Aug. 20, 1991 to K. Ross describes a cargo retaining device comprising a net made of crisscrossing material and a cord. The cord is secured to the net by knots and attached to the cargo-hauling vehicle. The device allows the net to cover and secure the cargo within the vehicle bed.

U.S. Pat. No. 6,077,007, issued Jun. 20, 2000 to E. Porter et al. relates to a pick-up truck bed organizer and method. The organizer fits within the bed of a truck and is comprised of multiple legs, which are connected to each other with connectors. The connectors each have tubular plugs to which the legs telescopingly connect. The legs and connectors may be rearranged to allow for varying sizes and types of cargo to fit within the truck bed.

U.S. Pat. No. 6,149,361, issued Nov. 21, 2000 to D. Schrader describes a securement device for securing cargo within a truck. The device consists of a hollow member attached about the top perimeter of a truck box and an additional hollow member attached at a higher level about the perimeter of the truck box. Cords for securing cargo are fastened within the hollow member and are slidable along the hollow member.

Other patents showing cargo fastening equipment include U.S. Pat. Pub. No. 2002/0164225 A1, published Nov. 7, 2002 and invented by M. Snyder et al. (tie-down system with deformation region); U.S. Pat. Pub. No. 2003/0095846 A1, published May 22, 2003 and invented by D. Breckel (cargo tie-downs and rail systems including such tie-downs); U.S. Pat. No. 3,841,660, issued Oct. 15, 1974 to B. Clark (pick-up truck rail assembly and tie-down device); U.S. Pat. No. 4,487,537, issued Dec. 11, 1984 to H. Morse (drum tie-down apparatus); U.S. Pat. No. 4,650,383, issued Mar. 17, 1987 to P. Hoff (cargo stabilizer for utility vehicles); U.S. Pat. No. 4,717,298, issued Jan. 5, 1988 to J. Bott (cargo restraining system); U.S. Pat. No. 4,900,204, issued Feb. 13, 1990 to R. Summers (elastic spider web cargo restraint devices); U.S. Pat. No. 4,955,771, issued Sep. 11, 1990 to J. Bott (cargo restraint system).

Additional patents showing cargo fastening devices include U.S. Pat. No. 5,259,711, issued Nov. 9, 1993 to G. Beck (tie-down apparatus); U.S. Pat. No. 5,431,472, issued Jul. 11, 1995 to R. Coffland (convertible pickup side rail apparatus); U.S. Pat. No. 5,538,376, issued Jul. 23, 1996 to W. Borda (apparatus and method for securing large objects); U.S. Pat. No. 5,599,055, issued Feb. 4, 1997 to J. Brown (insert for a pickup truck bed); U.S. Pat. No. 5,716,176, issued Feb. 10, 1998 to R. Anderson (cargo net with enhanced elasticity); U.S. Pat. No. 5,772,369, issued Jun. 30, 1998 to S. Lerman et al. (air cargo restraint system and fittings therefore); U.S. Pat. No. 6,065,916, issued May 23, 2000 to F. Swensen (portable base for anchoring and transporting unstable articles).

Further patents showing cargo fastening devices include U.S. Pat. No. 6,290,440 B1,. issued Sep. 18, 2001 to J. DiVaccaro (tie down strap container); U.S. Pat. No. 6,315, 346 B1, issued Nov. 13, 2001 to H. Martin (load and lock tailgate); U.S. Pat. No. 6,439,815 B1, issued Aug. 27, 2002 to C. Liu (fastening device adapted for tightening a rope to fasten goods on a platform of vehicle); U.S. Pat. No. 6,626,620, issued Sep. 30, 2003 to J. Veal (load retaining apparatus on a vehicle); U.S. Pat. No. 6,629,807 B2, issued Oct. 7, 2003 to R. Bernardo (adjustable truck bed divider for stabilizing cargo); U.S. Pat. No. 6,644,901 B2, issued Nov. 11, 2003 to D. Breckel (cargo tie-downs and rail systems including such tie-downs); U.S. Pat. No. 6,655,887 B2, issued Dec. 2, 2003 to S. McDonald (tie down anchor devices and products thereof); Jap. Pat. No. 61-044040, published Mar. 3, 1986 (rope hook device for carrier vehicle); Jap. Pat. No. 61-160647, published Jul. 21, 1986 (C-shaped rope hanger).

None of the above inventions and patents, taken either singly or in combination, is seen to describe the instant invention as claimed. Thus a device to secure cargo solving the aforementioned problems is desired.

SUMMARY OF THE INVENTION

The invention is a cargo securing device for restraining cargo within a vehicle. A chain assembly extends about the entire perimeter of a cargo area of a vehicle, and is attached to spaced locations along the cargo area sidewalls. Alternatively, the chain assembly may be attached to the cargo area floor. Once the chain assembly, made up of a number of links, is secured to the cargo area sidewalls, restrainers such as straps, hooks or other fasteners may be attached onto any link in the chain assembly. The restrainers are used to restrain cargo stored within the cargo area. Generally the chain assembly is fixed to the cargo area sidewalls at four points such that the chain assembly is formed into a rectangular shape. However, the chain assembly may be fixed to the sidewalls at additional points according to the preferences of the user.

In an additional embodiment, brackets are joined onto the chain assembly at various points, but generally at four points such that the chain assembly is formed into a rectangular shape. The brackets are attached to the cargo area sidewalls, securing the chain assembly to the sidewalls. The brackets are either welded or bolted to the walls. The brackets may be affixed to the wall by sliding the brackets to holding latches already affixed to the cargo area sidewalls.

Additionally, telescoping units are used with the cargo securing device to heighten or lower portions of the chain assembly, allowing the restrainers to restrain the cargo on different levels. Each telescoping unit has a rod and a hollow shaft into which the rod is inserted. The telescoping units generally are affixed to the sidewalls at four corners of the cargo area. The telescoping units are either welded directly onto the sidewalls or welded or bolted to the brackets that are secured to the cargo area walls.

The chain assembly is attached to the bottoms of the telescoping units with fasteners, such as hooks. An additional chain assembly is attached to the tops of the telescoping units with fasteners. The additional chain assembly runs from the top of each telescoping unit to the top of the next telescoping unit. The telescoping units may then be raised or lowered according to the height of the cargo, thus allowing the chain assemblies to surround the cargo at different heights. The chain assemblies may be a single chain structure about the tops of the telescoping units and descended downwardly to be attached at the bottoms of the telescoping units.

Portions of the chain assembly may be shortened or lengthened. The portions of the chain assembly are adjusted by relooping the chain assembly through the brackets. In addition, certain brackets through which the chain assembly may be extended allow the chain assembly to be shortened or lengthened by adding or removing slack in the chain.

One aspect of the invention is that the cargo securing device provides for multiple attachment points to which the restrainers are linked. The multiple attachment points provide for better safety in retaining the cargo by preventing stray cargo pieces from falling off the cargo vehicle. Another aspect is that the cargo securing device may have multiple levels such that retainers may restrain the cargo at different heights. A further aspect of the invention is that the cargo securing device does not materially alter the existing layout of the cargo bed.

It is an aspect of the invention to provide improved elements and arrangements thereof for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a cargo securing device 10 for restraining cargo. The device 10 is made up of a chain assembly 12 extended around a perimeter of a cargo area of a vehicle and several brackets 16 connected to the chain assembly 12. The brackets 16 are attached to the sidewalls 20 of the vehicle such that the chain assembly 12 is affixed to the sidewalls 20. Restrainers 30 latch onto the chain assembly 12, and wrap about cargo 40, securing the cargo 40 in place. Alternatively, the brackets 16 could be welded or bolted to the cargo bed sidewalls, or slid into holding latches affixed to the sidewalls (not shown).

Figure 1:
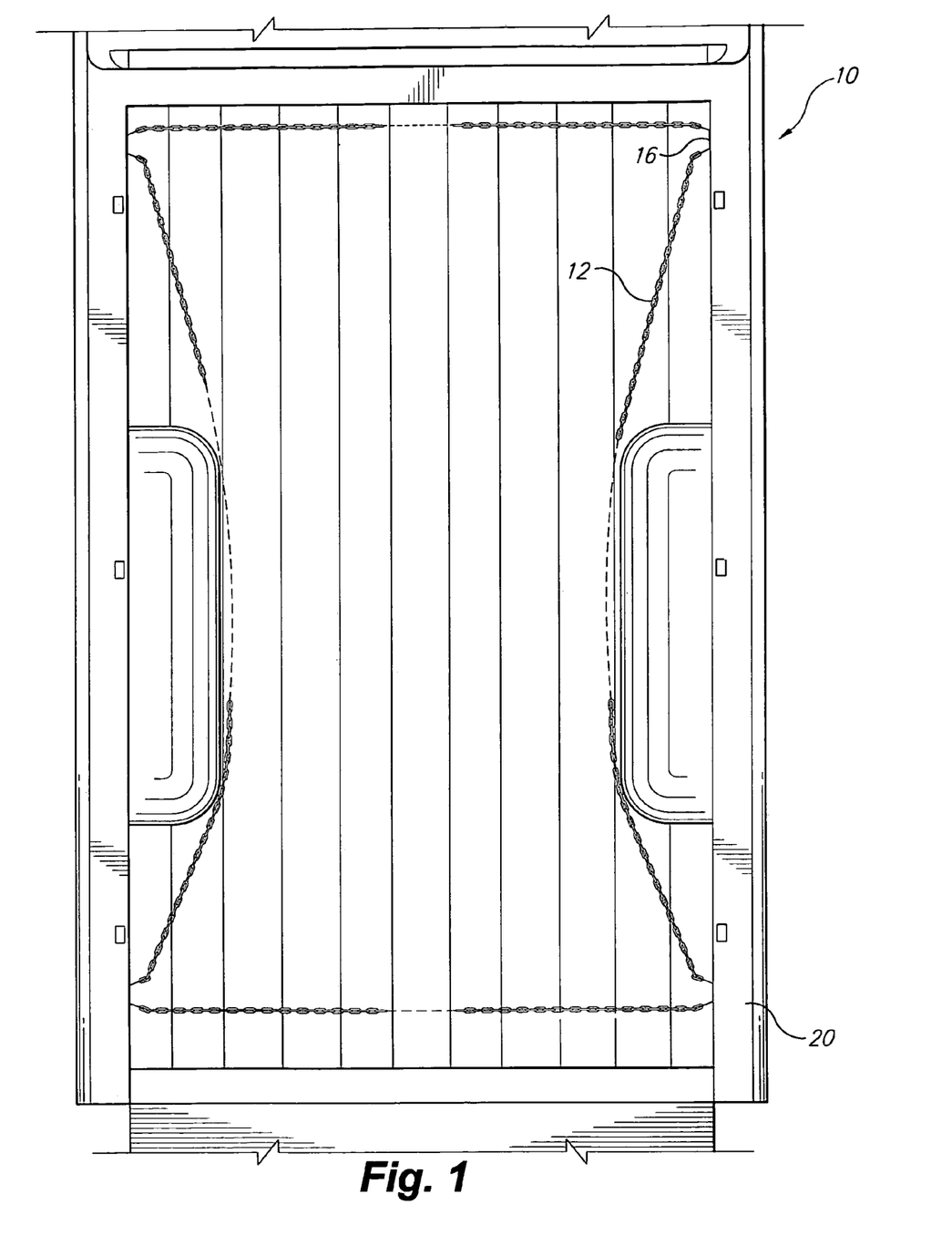
FIG. 1 is an environmental plan view of a cargo securing device according to a first embodiment of the present invention.

Referring first to FIG. 1, the cargo securing device 10 is shown with the chain assembly 12 and the brackets 16, the device 10 being attached to the sidewalls 20 of the cargo area. The chain assembly 12 has multiple links 14 and 18 affixed to each other. There are permanently connected links 14 and detachable links 18 that may be detached from the permanently connected links 14. Multiple brackets 16 attach to portions of the chain assembly 12. The detachable links 18 are screwed onto the brackets 16, connecting the chain assembly 12 to the brackets 16. The brackets 16 are affixed to the cargo area sidewalls 20 by welding the brackets 16 onto the sidewalls 20, bolting the brackets 16 onto the sidewalls 20, or securing the brackets 16 to restraining mechanisms integrally provided on the sidewalls 20 of the cargo area. The brackets 16 generally are attached to the sidewalls 20 at four corners of the cargo area.

Additional brackets 16 may be added to the chain assembly 12 to allow additional fastening points for the restrainers 30. A portion of the chain assembly 12 may be extended down the center of the cargo bed so that the cargo bed may be divided into sections to better retain certain types of cargo. Other anchoring devices, such as snap links, may be used in substitution for the brackets 16.

Figure 2A:
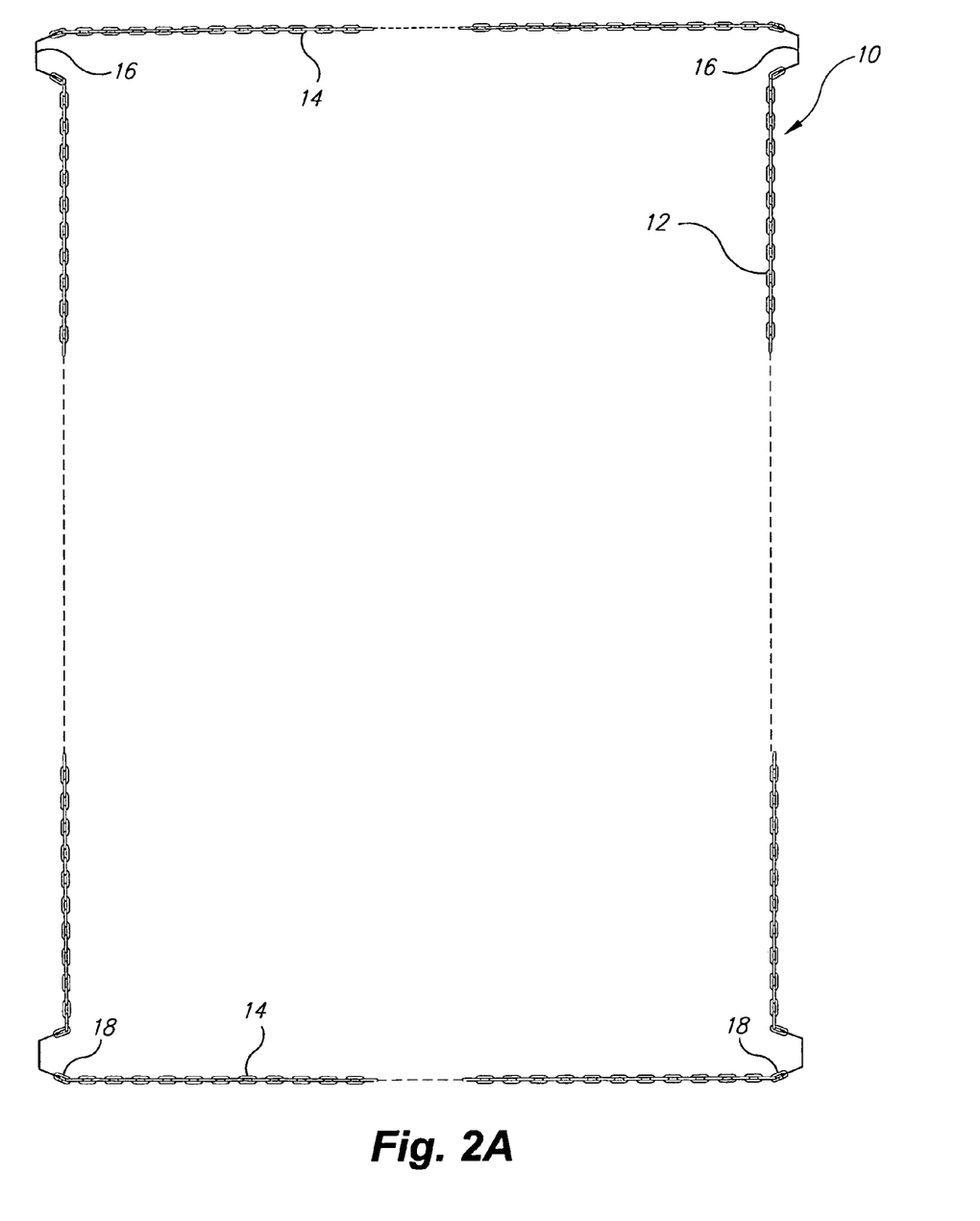
FIG. 2A is a plan view of the cargo securing device according to the first embodiment of the present invention alone.

Turning now to FIG. 2A, the cargo securing device 10 is shown unattached to the cargo area sidewalls 20. The device 10 is constructed with brackets 16 and the chain assembly 12 attached to the brackets 16. The detachable links 18 are screwed onto retaining holes 24 situated on each bracket 16. The detachable links 18 secure the brackets 16 onto the chain assembly 12.

Figure 2B:
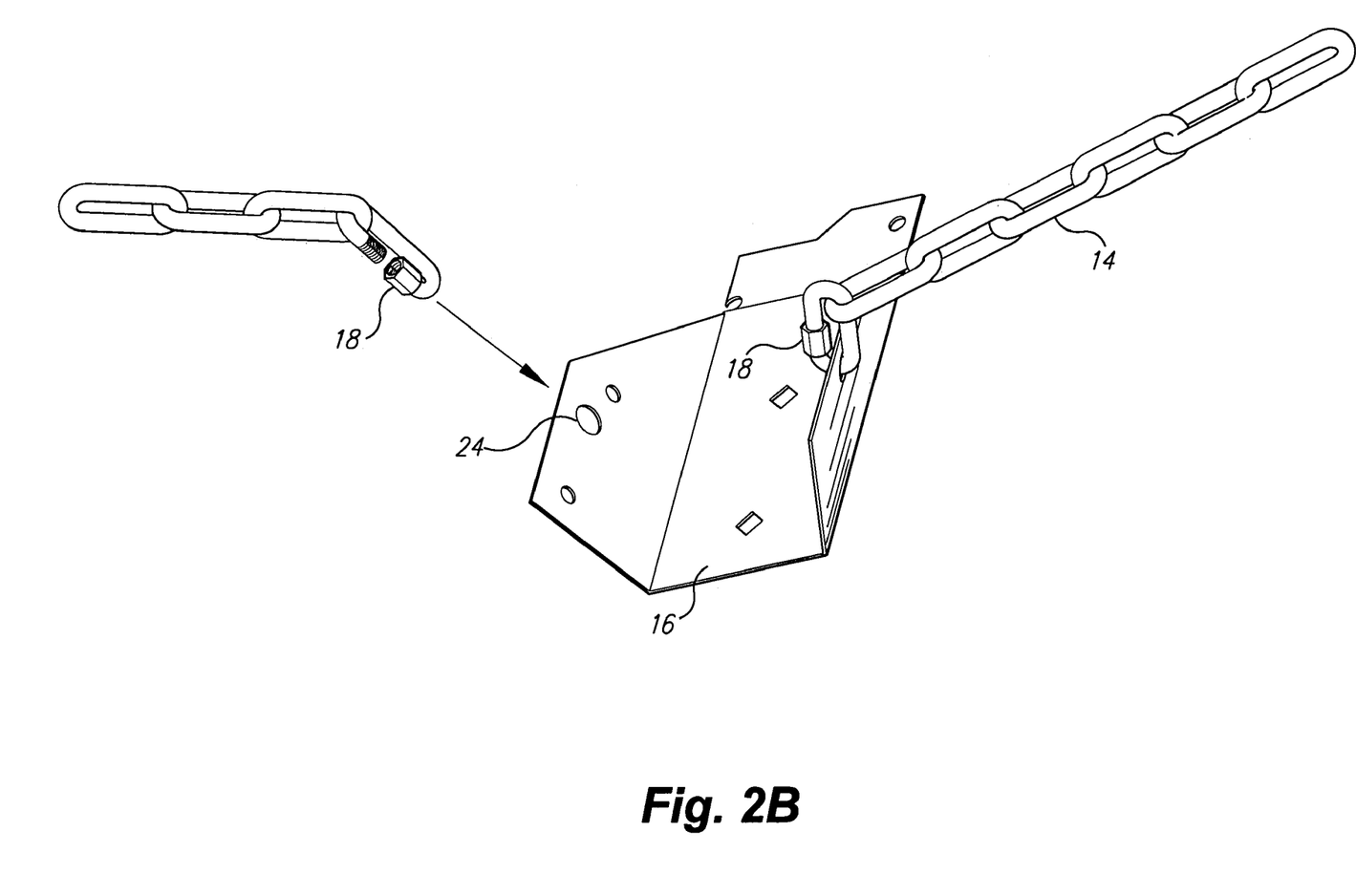
FIG. 2B is a perspective view of a portion of the cargo securing device according to the first embodiment of the present invention.

FIG. 2B shows one of the brackets 16 with a portion of the chain assembly 12 attached. The detachable link 18 is affixed to the permanently connected links 14, and the detachable link 18 is additionally screwed onto the retaining hole 24 in the bracket 16.

In another embodiment, the cargo securing device 10 may be attached directly to the cargo area sidewalls 20. The brackets 16 are omitted, and the chain assembly 12 is welded or affixed in another manner onto the sidewalls 20.

Figure 3:
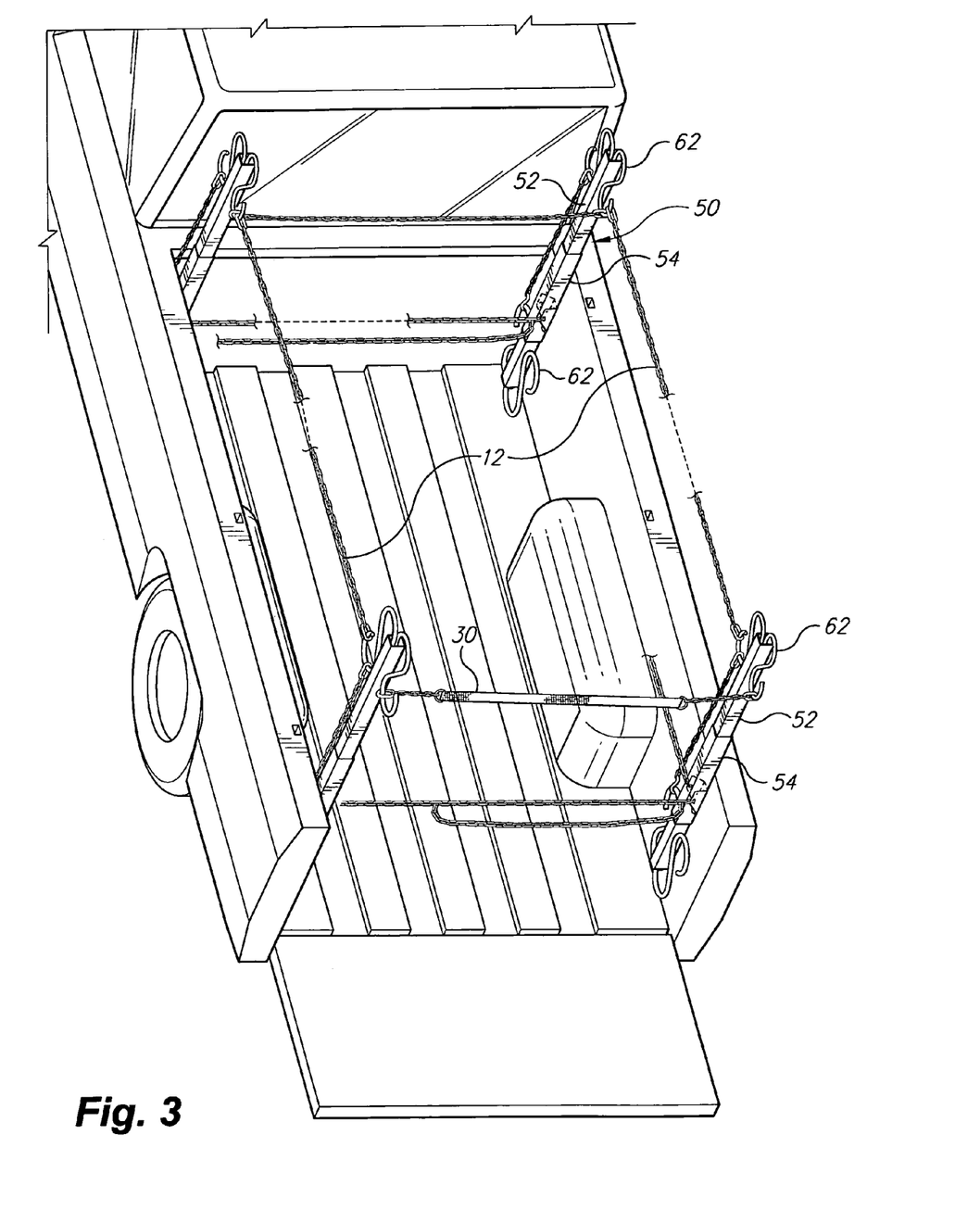
FIG. 3 is an environmental, perspective view of the cargo securing device according to a second embodiment of the present invention.

Turning now to FIG. 3, an additional embodiment of the cargo securing device 10 is shown with the added elements of multiple telescoping units 50. Each telescoping unit 50 has a telescoping rod 52 that is inserted within a hollow telescoping shaft 54 and is able to be extended vertically. The telescoping units 50 generally are situated at four corners of the cargo area. The chain assembly 12 is attached to the bottoms of the telescoping units 50 using S-shaped hooks 62. An additional chain assembly 12 is attached to the tops of the telescoping units 50 with the S-shaped hooks 62. Any other suitable fastening device may be used in place of the hooks 62 to secure the chain assembly 12 to the telescoping units 50. The chain assemblies 12 may be a single chain structure about the tops of the telescoping units 50 and descended downwardly to be attached at the bottoms of the telescoping units 50.

Restrainers 30 are latched onto the links 14 or 18 of the chain assembly 12. Additional telescoping units 50 may be added to allow restrainers 30 to attach to more points on the chain assembly 12. The telescoping units 50 are attached to the brackets 16, which are secured to the sidewalls 20, by welding or bolting the units 50 to the brackets 16. The telescoping units 50 may additionally be welded or bolted directly onto the cargo area sidewalls 20. The telescoping rods 52 of the telescoping units 50 may be raised or lowered according to the needs of the user.

A section of the chain assembly 12 may be shortened by relooping a portion of the chain assembly 12 to one of the brackets 16, as shown in FIG. 3. Certain types of brackets 16 allow portions of the chain assembly 12 to be pulled through the brackets 16 to shorten or lengthen those portions of the chain assembly 12 so that the cargo 40 is better secured.

Figure 4:
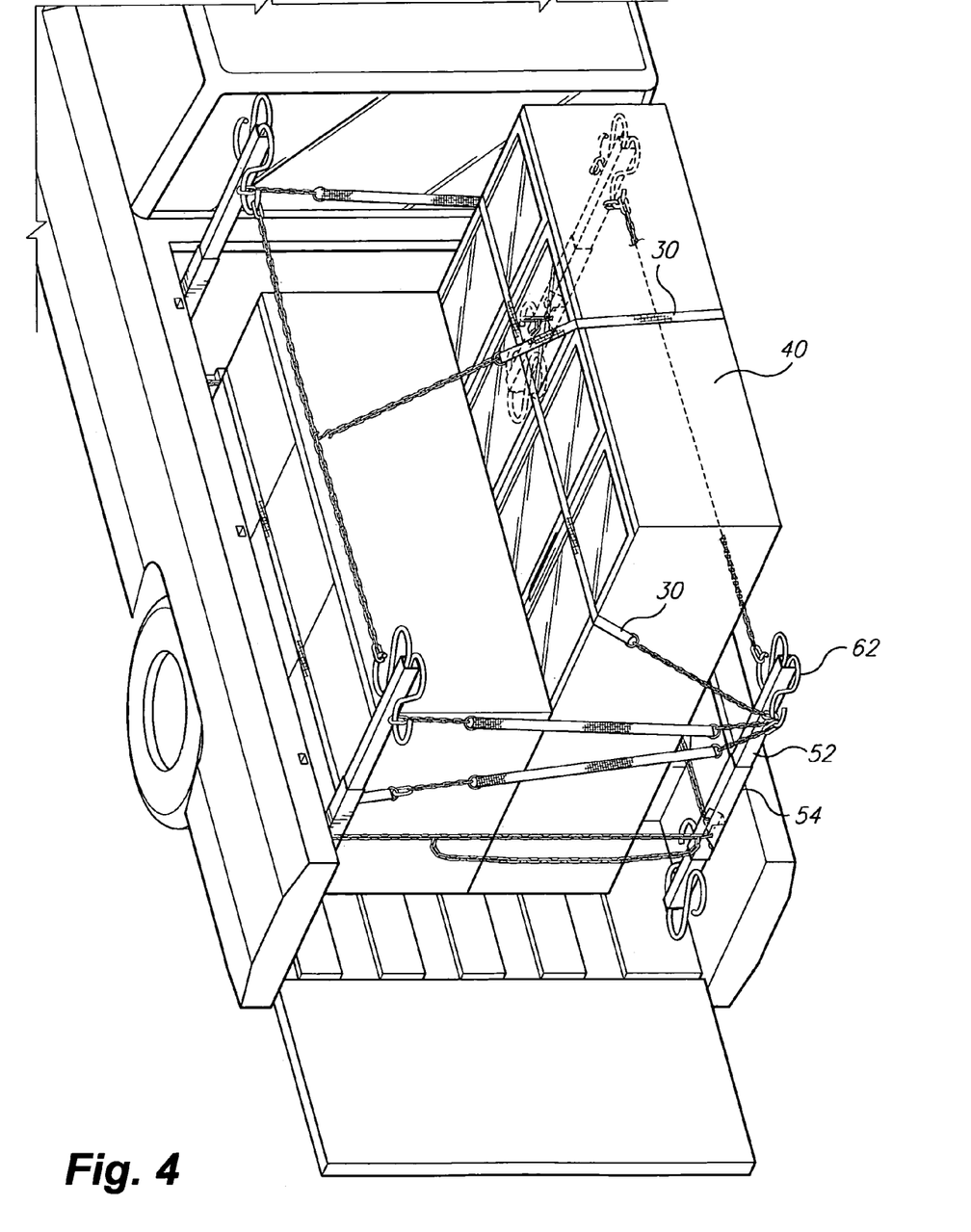
FIG. 4 is an environmental, perspective view of the cargo securing device according to the second embodiment of the present invention with cargo.

FIG. 4 shows the cargo securing device 10 with the telescoping units 50 and the brackets 16 being attached to the cargo bed floor. Restrainers are attached to the chain assembly 12. The cargo securing device 10 allows the restrainers 30 to restrain cargo 40 within the cargo area at multiple levels.

Additionally, a section of the chain assembly 12 between two of the brackets 16 may be detached to allow for longer cargo 40 to be situated without the impediment of the chain assembly 12.

The cargo securing device 10 may be attached to a vertical surface, such as a sidewall, or a horizontal surface, such as a cargo floor.

A locking mechanism (not shown) may be affixed to one of the brackets 16 of the cargo securing device 10 in order to lock the cargo securing device 10 to prevent theft.

It is to be understood that the present invention is not limited to the embodiments described above, but encompasses any and all embodiments within the scope of the following claims.

I claim:

1. A cargo securing system for restraining cargo in a vehicle cargo area having a cargo bed, said vehicle cargo area having a perimeter located above said cargo bed and lying in a substantially horizontal plane, said cargo securing system comprising:
 a chain assembly having a plurality of attached links, said chain assembly configured to be disposed in said substantially horizontal plane above the vehicle cargo bed of said vehicle cargo area, said chain assembly further configured to extend around substantially the entire said perimeter of said vehicle cargo area;
 at least four anchoring devices;
 wherein said at least four anchoring devices includes a plurality of brackets;
 each bracket of said plurality of brackets comprising:
  a flat central portion with a top, a bottom and a pair of parallel side edges;
  a flat first side portion having at least one retaining hole therethrough, said first side portion extending at an angle from one of said parallel side edges; and
  a flat second side portion having at least one retaining hole therethrough, said second side portion extending at an angle from the other of said parallel side edges;
 a plurality of detachable links;
 wherein said at least four anchoring devices are attached to said chain assembly by said detachable links;
 wherein said at least four anchoring devices are adapted to secure said chain assembly onto a surface of a vehicle with said chain assembly disposed in said substantially horizontal plane and said chain assembly extending around substantially the entire perimeter of said vehicle cargo area;
 at least one flexible restrainer configured to wrap around said cargo and secure said cargo to said vehicle cargo area;
 wherein said plurality of attached links of said chain assembly provide multiple attachment points for said at least one restrainer to be fastened thereon for restraining cargo; and
 said at least one flexible restrainer being attached to said plurality of attached links of said chain assembly at two or more of said attachment points.

2. The cargo securing system according to claim 1, wherein the surface of the vehicle is a sidewall.

3. The cargo securing system according to claim 1, further comprising:
 a plurality of telescoping units;
 each telescoping unit having a telescoping shaft and a telescoping rod;
  wherein said telescoping rod is inserted within and extends vertically from said telescoping shaft;

means attaching said telescoping shafts of said telescoping units to said plurality of brackets, with each of said plurality of telescoping units attached to one of said plurality of brackets; and wherein there is an additional chain assembly attached at the tops of said telescoping units.

4. The cargo securing system according to claim 3, wherein said means attaching said telescoping shafts of said telescoping units to said plurality of brackets comprise bolts.

5. The cargo securing system according to claim 3, wherein said means attaching said telescoping shafts of said telescoping units to said plurality of brackets comprise welding.

6. The cargo securing system according to claim 3, further comprising a plurality of fasteners, said fasteners attaching said additional chain assembly to the tops of said telescoping units.

7. The cargo securing system according to claim 3, wherein said additional chain assembly comprises a single chain structure attached to said tops of said telescoping units, and descending downwardly to be attached at the bottoms of said telescoping units.

* * * * *